US006907375B2

(12) United States Patent
Guggari et al.

(10) Patent No.: US 6,907,375 B2
(45) Date of Patent: Jun. 14, 2005

(54) METHOD AND APPARATUS FOR DYNAMIC CHECKING AND REPORTING SYSTEM HEALTH

(75) Inventors: Mallappa I. Guggari, Cedar Park, TX (US); William L. Koederitz, Cedar Park, TX (US)

(73) Assignee: Varco I/P, Inc., Houston, TX (US)

( * ) Notice: Subject to any disclaimer, the term of this patent is extended or adjusted under 35 U.S.C. 154(b) by 0 days.

(21) Appl. No.: 10/373,216

(22) Filed: Feb. 24, 2003

(65) Prior Publication Data

US 2004/0088115 A1 May 6, 2004

Related U.S. Application Data

(60) Provisional application No. 60/424,262, filed on Nov. 6, 2002.

(51) Int. Cl.$^7$ ............................................. G01L 25/00
(52) U.S. Cl. ..................... 702/113; 702/188; 340/853.2
(58) Field of Search .......................... 702/6–13, 34–35, 702/81–84, 113–114, 182–183, 185, 188; 340/853.1, 853.2; 700/79–80, 108–110; 455/3.01–3.04, 507–508

(56) References Cited

U.S. PATENT DOCUMENTS

| | | | |
|---|---|---|---|
| 3,219,107 A | | 11/1965 | Brown et al. |
| 3,629,859 A | | 12/1971 | Copland et al. |
| 4,432,064 A | | 2/1984 | Barker et al. |
| 4,573,115 A | | 2/1986 | Halgrimson |
| 5,278,549 A | | 1/1994 | Crawford |
| 5,329,465 A | | 7/1994 | Arcella et al. |
| 5,975,204 A | | 11/1999 | Tubel et al. |
| 6,012,016 A | * | 1/2000 | Bilden et al. .................. 702/12 |
| 6,192,980 B1 | * | 2/2001 | Tubel et al. ................ 166/65.1 |
| 6,393,363 B1 | * | 5/2002 | Wilt et al. ...................... 702/6 |
| 6,408,953 B1 | * | 6/2002 | Goldman et al. .............. 175/39 |
| 6,519,568 B1 | * | 2/2003 | Harvey et al. .................. 705/1 |
| 6,553,316 B2 | * | 4/2003 | Bary et al. ..................... 702/16 |
| 6,553,336 B1 | * | 4/2003 | Johnson et al. ............. 702/188 |
| 6,693,553 B1 | * | 2/2004 | Ciqlenec et al. ........... 340/853.1 |
| 2002/0018399 A1 | * | 2/2002 | Schultz et al. ................. 367/81 |
| 2002/0035551 A1 | * | 3/2002 | Sherwin et al. ............. 705/412 |
| 2002/0065698 A1 | * | 5/2002 | Schick et al. ................... 705/8 |
| 2003/0038734 A1 | * | 2/2003 | Hirsch et al. ............ 340/853.1 |
| 2003/0109951 A1 | * | 6/2003 | Hsiung et al. .............. 700/108 |

OTHER PUBLICATIONS

Guggari et al., "Design and Application Considerations for Inverters in Fluid Flow Control", Oct. 1988, Conference Record of the 1988 IEEE, vol. 2, pp. 1779–1783.*

* cited by examiner

*Primary Examiner*—Marc S. Hoff
*Assistant Examiner*—Mary Catherine Baran
(74) *Attorney, Agent, or Firm*—Guy McClung

(57) ABSTRACT

The present invention provides a method and apparatus for remotely analyzing and affirmatively notifying appropriate personnel of problems and events associated with an oil recovery system—comprising hundreds of oil rigs over a vast geographic area. The results of selected Health Checks, which are run on each oilrig, are reported to a central server. The central server populates a data base for the oil recovery system, displays a red/yellow/green color coded electronic notification and status for an entire oil recovery system and affirmatively alerts appropriate personnel of actions required to address events associated with an oilrig in an oil recovery system. The diagnostics run at each oilrig are configurable at the individual rig. The present invention provides a dynamic oilrig status reporting protocol that enables population and display of a tree node structure representing an entire oil recovery system status on a single screen at a top level. Detailed information is available by drilling down in to other screens, enabling rapid visual evaluation of a system Health Check.

39 Claims, 12 Drawing Sheets

Rigs in Western Hemisphere - Browser

Address: http://cp2kvang016/varcodrill/RigStatus.aspx?rig=569&DeviceName=8DeviceState=0&TopNode=00

Current Status of Rigs — 114

| Rigs | Link | Status |
|------|------|--------|
| 561 | O | O |
| 562 | O | O |
| 563 | O | O |
| 564 | O | O |
| 565 | O | O |
| 566 | O | O |
| 567 | O | O |
| 568 | O | O |
| 569 | O | O |
| 570 | O | O |
| 571 | O | O |
| 572 | O | O |

- O OK
- O Failed
- O Caution
- O Inconclusive
- ⊠ Rig Stacked

Status of Rig-569

Health Checks:

System Health Check Summary Results as on: 9/6/2002

| Joystick | Override | Tunning Changes | BCS | RigSense |
|----------|----------|-----------------|-----|----------|
| O | O | O | O | O — 312 |

314 ↑    320 ↓    310

Summary Rig Report for 9/6/2002

Rig Status. At 0648 Mike reported that the rig was drilling ahead. The equipment was working as designed with no problems to report. Encoder Failure Alarm. At 1845 Clarence reported an encoder failure alarm and minor problem with the block surging during reaming. Trend indicated that both Encoders (A&B) were still tracking correctly but was unable to identify any surging evidence. CC called Marcus who was already on his way to the rig. At 0113 Marcus reported that he checked the status on the rig and did not find any encoder failure alarm or block surging issues.

AutoDriller Performance on OTC: — 316

| Parameter | % Time Enabled | % Time in Control | Avg. for 24 Hours | % Time Within Acceptable Zone | +/- Target Control Range |
|-----------|----------------|-------------------|-------------------|-------------------------------|--------------------------|
| ROP ft/hr | 100 | 28.79 | 102.77 | 90.58 O | 10 % of SP |
| WOB klbs | 100 | 71.17 | -14.74 | 0.17 O — 317 | 1 klb |
| Torque | 0 | 0 | | Insignificant Data | 10 % of SP |
| Delta-P psi | 0 | 0 | | Insignificant Data | 100 psi |

Driller Adjustable Parameters

| Parameter Name | Current Value | Changed? | Outside Range |
|----------------|---------------|----------|---------------|
| Drill Lo Set Point | 0 | | |

Health Checks on Rig - 569

○ RigSense System

| Details Link | Device Name | Device Status | Operation | Device Message |
|---|---|---|---|---|
| 🔍 | Sensor Group | ○ | Click on Magnifying Glass for more details — 415 | |
| 🔍 | RS AppServer | ○ | OK | |
| | RS NTTracer | ○ | OK | |
| | RS Client | ○ | | |

○ Well Data Net

| Details Link | Device Name | Device Status | Operation | Device Message |
|---|---|---|---|---|
| | Satellite System | ○ | OK | |
| | Data Server | ○ | OK | |
| | Web Application | | Unknown | |

*Fig. 4B*

Varco®  Imagine the Possibilities
Realize the Efficiencies e-drill Service Center - PD Company Rigs

Global  SW-USA  US Rockies  Canada  North Sea  South America  Rig Reports  Config Changes  Historical Data  Log Out Current Status of Rigs — 114

| Rigs | Link | Status |
|---|---|---|
| 561 | O | O |
| 562 | O | O |
| 563 | O | O |
| 564 | O | O |
| 565 | O | O |
| 566 | O | O |
| 567 | O | O |
| 568 | O | O |
| 569 | O | O |
| 570 | O | O |
| 571 | O | O |
| 572 | O | O |

RigSense System Status on Rig - 569

O Sensor Group

| Details Link | Device Name | Device Status | Operation | Device Message |
|---|---|---|---|---|
| | Standpipe pressure sensor | O | Continuous loss of signal | |
| | Pump 1 stroke count sensor | O | Unknown | |
| | Pump 2 stroke count sensor | O—516 | OK | |
| | Pump 3 stroke count sensor | O—514 | Intermittent loss of signal | 512 |
| 518 | Hookload sensor | | | |

510 o OK
o Failed
o Caution
o Inconclusive
o Rig Stacked

*Fig. 5*

Driller Adjustable Parameters

| Parameter Name | Current Value | Changed ? | Outside Range ? | |
|---|---|---|---|---|
| Date of Data | 2/22/2002 | | | ← 710 |
| Drill Lo Set Point | 10.5 | | ○— 712 | |
| Lo Set Point | 1.7 | | | |
| Upper Set Point | 101 | | ○— 714 | |
| Swab Speed | 355 | | | |
| TripIn Surge Speed | 100 | | | |
| Stand Lowering Time | 10 | | | |
| Casing Surge Speed | 100 | | | |
| Joint Lowering Time | 2 | | | |
| Connection Lowering Speed | 15 | | | |
| Connection Hoist Speed | 20 | | | |
| Kickout Height | 87.2 | | | |
| Tripout High Alert | 85 | | | |
| ROP Set Point | 150 | | | |
| WOB Set Point | 40 | | | |
| Torque Set Point | 1500 | | | |
| DeltaP Set Point | 280 | | | |
| Cut & Slip Engine RPM | 700 | | | |
| Lines Strung | 10 | | | |
| Ball Height | 11 | | | |

Driller Tuning Parameters

| Parameter Name | Current Value | Changed ? | Outside Range ? | |
|---|---|---|---|---|
| Date of Data | 2/22/2002 | | | ← 716 |
| Large Piston Drilling Bias | 0 | | | |
| Large Piston Tripping Bias | -5 | | | |
| ROP Gain Factor-Driller | 0.5 | | | |

*Fig. 7*

VICIS-ED Configuration Parameters

Driller Adjustment Parameters

| Parameter Name \ Rig # | 178 | 179 | 180 | 181 | 182 | 183 | 184 | 185 | 186 | 187 | 188 | 189 |
|---|---|---|---|---|---|---|---|---|---|---|---|---|
| Date of Data | 2/22/2002 | 2/22/2002 | 2/22/2002 | 2/22/2002 | 2/22/2002 | No Data | 2/22/2002 | 2/22/2002 | 2/22/2002 | 2/22/2002 | 2/22/2002 | 2/22/2002 |
| Drill Lo Set Point | 9 | 7 | 10.5 ⊙ | 9 | 9 | N/A | 9.8 | -1.5 | 6.5 ⊙ | 8.3 | 8.227 ⊙ | 11.4 ⊙ |
| Lo Set Point | 1 | 1.5 | 1.7 | 0.5 | 8.996 ⊙ | N/A | 0.1 | -1.5 | 1 | 1.6 | 1.3 | 3 |
| Upper Set Point | 99 ⊙ | 100 ⊙ | 101 | 95 | 96 ⊙ | N/A | 90 | 99 | 99 | 99 | 105.1 ⊙ | 95.5 ⊙ |
| Swab Speed | 180 | 255 | 355 | 50 | 100 | N/A | 200 | 200 | 30 | 300 | 200 | 30 |
| TripIn Surge Speed | 60 | 160 | 100 | 100 | 50 | N/A | 40 | 200 | 30 | 70 | 200 | 140 |
| Stand Lowering Time | 25 | 40 | 10 | 60 | 5 | N/A | 100 | 27 | 5 | 20 | 25 | 20 |
| Casing Surge Speed | 20 | 155 | 100 | 30 | 50 | N/A | 10 | 100 | 15 | 25 | 100 | 140 |
| Joint Lowering Time | 12 | 60 | 2 | 40 | 40 | N/A | 80 | 14 | 5 | 5 | 5 | 9 |
| Connection Lowering Speed | 20 | 32 | 15 | 50 | 10 | N/A | 50 | 40 | 20 | 20 | 25 | 50 |
| Connection Hoist Speed | 50 | 45 | 20 | 50 | 50 | N/A | 50 | 40 | 30 | 30 | 50 | 50 |
| Kickout Height | 60 | 60 | 87.2 | 47 | 60 | N/A | 75 | 71.2 | 61 | 65 | 88 | 80 |
| Tripout High Alert | 85 | 85 | 85 | 28 ⊙ | 60 | N/A | 75 | 65 | 60 | 65 | 88 | 85 |
| ROP Set Point | 150 | 55 | 150 | 50 | 150 | N/A | 250 | 150 | 21 | 175 | 50 | 70 |
| WOB Set Point | 10 | 40 | 40 | 8 | 11 | N/A | 20 | 12 | 13 | 8 | 15 | 43 |
| Torque Set Point | 650 | 300 | 1500 | 500 | 280 | N/A | 660 | 1500 | 650 | 220 | 400 | 400 |
| DeltaP Set Point | 500 | 200 | 280 | 200 | 400 | N/A | 500 | 139 | 500 | 200 | 250 | 200 |
| Cut & Slip Engine RPM | 700 | 715 ⊙ | 700 | 700 | 700 | N/A | 700 | 700 | 700 | 700 | 700 | 700 |
| Lines Strung | 10 | 10 | 10 | 10 | 8 | N/A | 10 | 10 | 10 | 10 | 0 | 12 |

810

Changed in last 24 Hours ○
Outside Permissible Range ⊙
Invalid Data ○

*Fig. 8*

METHOD AND APPARATUS FOR DYNAMIC CHECKING AND REPORTING SYSTEM HEALTH

CROSS REFERENCE TO RELATED APPLICATIONS

This patent application is related to and takes priority from U.S. Provisional Patent Application No. 60/424,262 filed on Nov. 6, 2002 entitled "Method and Apparatus for Dynamic Checking and Reporting System Health" by M. Guggari and B. Koederitz.

BACKGROUND OF THE INVENTION a. Field of the Invention

The present invention relates to the field of oil recovery system diagnostics and analysis and the human interface for comprehension and affirmative reporting of events associated with the optimization of the oil recovery process.

b. Summary of the Related Art

As the next generation of knowledge-based or artificial intelligence systems begins to emerge, they will be characterized by their ability to deal directly-with the real world environment rather than via a human intermediary on site at a particular location. Among the more interesting classes of problems of this type are those that deal with the interpretation of observations of physical systems. Process monitoring and diagnostic systems are an important subclass. In these systems, a key aspect is to determine when an actual problem has taken place. While outright failures are relatively easy to detect, in many cases more subtle problems may be masked by artifacts of normal operation of the process being studied, its external environment, or the monitoring process itself. In order to detect these problems, it is often necessary to use detectors that are sensitive to a wide range of anomalous behavior and then use domain knowledge to classify the detected events into those that are truly problematical and those that do not require action.

U.S. Pat. No. 5,274,572 describes a method and apparatus for monitoring and analyzing signal data, which uses a network model describing the system under investigation and a runtime agent for acquiring the signal data and accessing the model if an anomaly in the signal data is indicated. The network model describes events of interests and how the events relate to phenomena in the system. The network model is constructed using an object-oriented approach with: observations of the events of interests in the system; situations which describe possible underlying causes of the observations; and relations which specify the logical relationship between the observations and situations. The runtime agent is constructed with an object-oriented approach using observers, which monitor the signal data and compute whether an anomaly in the incoming signal data exists. If an anomaly is identified, an "observation" is generated and the network model entered to analyze the observation and estimate a cause of the observation. The method and apparatus are applicable for interpreting phenomena in a wide variety of physical systems and have been exemplarily applied to monitoring the quality of oil well logging and laboratory material test sensor configurations.

Other known systems provide techniques for interactively analyzing system log-files, which are monitored by technical personnel and systems specialists to determine system performance, status, and software faults, which are often generated during various hardware and software monitoring operations. Each log-file contains time stamped reports. This technique is especially useful for analyzing large log-files. A new release of software may contain many incremental versions that must be tested. The testing of each incremental version may generate a log-file containing thousands of reports. Using this technique, reports are correlated, faults are isolated, and temporal patterns are recognized more quickly and efficiently than by using conventional, non-graphical techniques.

Contemporary oil recovery systems comprise a vast network of various and assorted oilrigs platforms which are typically wide spread geographically. It is complex and moreover prohibitively expensive to physically patrol, inspect and diagnose equipment failures, much less attempt to perform operational optimization in a fleet of hundreds or even thousands of oilrigs comprising a regional or global oil recovery system. Diagnosis and affirmative notification in such a system is complex and thus far in lack of an intelligible human interface. Alarms are typically premature, cryptic or lost in deluge of unintelligible data. Moreover, due to the expense and critical strategic importance of oil recovery systems, there is a critical need for a remote monitoring and diagnostic and notification service for a wide area oil recovery system. There are many types of failures and even a longer list of parameters to monitor in such a system. Thus, there is a need for an automated process running on a plurality of oilrigs comprising an oil recovery system that performs a Health Check monitoring function of an oil recovery system.

SUMMARY OF THE INVENTION

The present invention provides a method and apparatus for remotely monitoring, analyzing and affirmatively notifying appropriate personnel of problems and events associated with an oil recovery system comprising hundreds of oil rigs over a vast geographic area. The present invention provides a monitoring and reporting system that is referred to as a Health Check system. The present invention provides a variety of performance monitoring sensors at each oilrig in an oil recovery system. The results of selected diagnostics, which are run on each oilrig, are reported to a central server. The central server automatically populates a database for the oil recovery system and displays a red/yellow/green/gray color-coded report for an entire oil recovery system. The present invention also affirmatively alerts appropriate personnel of actions required to address events associated with an oilrig in an oil recovery system. The diagnostics performed at each oilrig are configurable at the individual rig. The central server need not change its reporting and display program when changes are made to a heath check at an oilrig. The present invention provides a dynamic oilrig status reporting protocol that enables construction and display of a tree node structure representing an entire oil recovery system status on a single screen. Preferably, top level information is presented on a single screen, and detailed information presented when one drills down in to other screens. Thus, the present invention enables rapid visual affirmation of a system Health Check.

A Health Check is an automated test that is running on the rig and monitoring something for acceptable performance, indication of problems, etc. These tests could be applied to equipments, drilling processes, or an operator's usage of particular drilling equipment. The results are then communicated to a central server located in a service center through a unique protocol, which allows automatic distribution and display of information. A test program on a rig can be modified and that change will flow automatically through communication, storage and display of the resulting Health Check data for the rig.

The service center based web server allows secure access to Health Check results. The results are presented in "top down tree" mode with red/yellow/green/gray colors. The red color indicates the failure of a test or flagging an event of interest, the yellow color indicates that the health test has found some abnormality that may need attention, green indicates successful completion of a test, and gray color indicates inability to conduct a test. The bottom-most node of the "top down tree" contains the results of a Health Check. The work-case result is successively carried up to the next level, until topmost node (which in most cases is the drilling rig, group of rigs or oil recovery system) is reached.

Each Health Check result can be configured to generate a message (email, phone call, PDA, etc.) to alert single or multiple persons in case of test failure. The data transfer protocol is well defined, such that other development groups or third parties can easily develop Health Check tests, generate results and feed information to the central server. Test results are transferred from the rig to the server using a novel data protocol that dynamically defines the structure of the data, that is, the node tree structure of the data by the naming convention of the protocol. Thus, the results are simply stored and displayed using the structural definition provided in the communication protocol. This allows for extreme flexibility in the definition of new programs and results to run and report at oilrigs without requiring a change in the communication protocol, notification function or the display and storage functions at the central server. The bottom-most nodes in the tree structure contain test results. Each test comes into the central server as a record containing node information as to where the information fits within the tree structure, an identifier for the test, a test result (red/yellow/green/gray) and intermediate data such as error codes, operator entry data and test data description. Thus, no results processing need occur at the central server. The central server only archives and display results and issues affirmative (with acknowledgement) and regular notifications as required.

Events or conditions can be set for notification, thus, once the event or condition occurs and after it is set for notification, a notification is sent to a designated person reporting the event of condition. A list of persons can be associated with each oilrig and event or condition. A notification can be sent to a cell phone, PDA or other electronic device. A notification can comprise a text, audio or video message to a user. A notification tells the rig status color code, text, aural or video. A user can call into the central server to check the status of an oilrig or oil recovery system. The status returned is a notification message indicating that the rig is okay or that a problem or condition of interest has occurred. Thus, the Health Checks are different than alarms, although alarms (including those alarms generated by prior or legacy systems) can be used as inputs to a Health Check where the alarms are processed and considered by Health Check rather than sending an alarm immediately to oilrig personnel. Health Check may indicate that piece of equipment is out of range and should be replaced in the near future, however, supercritical alarms can be processed by Health Checks to generate an immediate notification.

BRIEF DESCRIPTION OF THE FIGURES

For detailed understanding of the present invention, references should be made to the following detailed description of the preferred embodiment, taken in conjunction with the accompanying drawings, in which like elements have been given like numerals, wherein:

FIG. 3 is an illustration of a preferred status display for an oil recovery system showing status for individual rigs and panel results showing text descriptions and color-coded status for a single oilrig;

FIG. 4B is an illustration of an alternative status display for an oil recovery system and a sub status for an individual rig;

FIG. 5 is an illustration of a preferred status display for an oil recovery system and a lower level sub status for an individual rig;

FIG. 7 is an alternative tabular status display for an oil recovery system;

FIG. 8 is an alternative tabular status display for an oil recovery system;

DETAILED DESCRIPTION OF A PREFERRED EMBODIMENT

Figure 1:
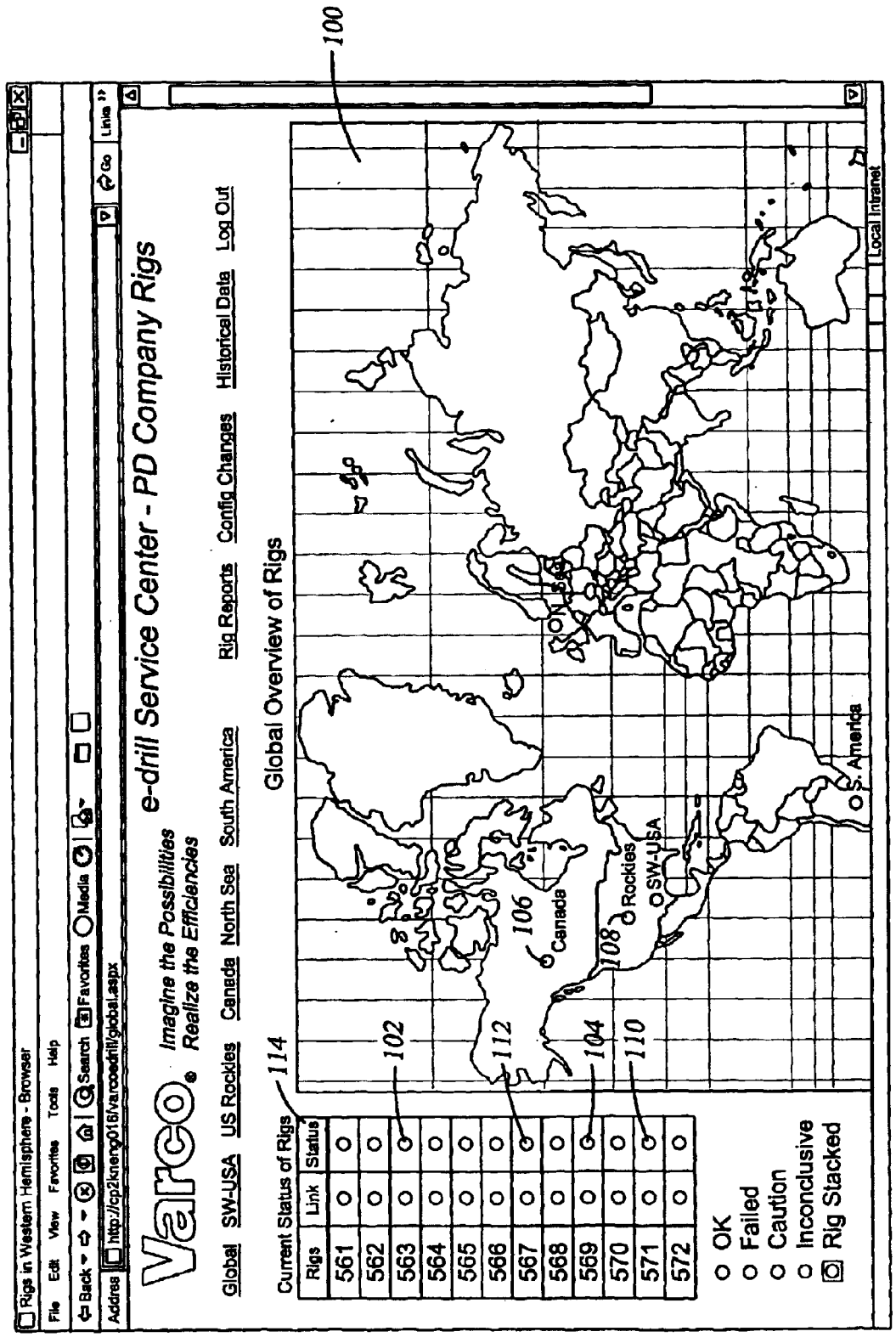
FIG. 1 is an illustration of a preferred status display for an oil recovery system showing status for individual rigs and aggregated worst-case status for geographical areas.

The present invention provides a method and apparatus for remotely monitoring, analyzing and affirmatively notifying appropriate personnel of problems and events of interest associated with an oil recovery system comprising hundreds of oil rigs over a vast geographical area or a single rig. The present invention provides a monitoring and reporting system that is referred to as a Health Check system. The present invention provides a variety of performance, process and equipment monitoring Health Checks and equipment sensors at each oilrig in an oil recovery system. The results of selected diagnostics, which are run on each oilrig, are reported to a central server. The central server populates a data base for the oil recovery system, displays a red/yellow/green/gray color coded report for an entire oil recovery system and affirmatively alerts appropriate personnel of actions required or advisories to address events associated with an oilrig in an oil recovery system. The Health Checks performed at each oilrig are configurable at the individual rig and from the central server or other processor associated with either the oilrig or central server. The central server need not change its reporting and display program when changes are made to a health check at an oilrig. The present invention provides a dynamic oilrig status reporting protocol that enables population and display of a tree node structure representing an entire oil recovery system or single oilrig status on a single screen. Thus, the present invention enables rapid visual or aural affirmation of a system Health Check.

Health Checks are not the same as alarms. An alarm is an immediate notification to an operator that a known unacceptable condition has been detected, requiring the operator's awareness of it and often some action by the operator. A Health Check may use alarms in its logic, but it is by nature different than an alarm. A heath check is more general and more diagnostic than an alarm, and does not require immediate action, at least not on the oilrig. In the present invention, a problem is reported to a central server for reporting and diagnosis to service personnel. A Health Check can apply to any equipment component or process, sensors, control systems, operator actions, or control processes, etc.

The Health Check system comprises software containing test logic. The logic is configurable so that inputs, outputs and logic can be selected by a user to test and look for any condition or event associated with an oilrig or oil recovery system. The overall system comprises Health Checks running in real time on a computer at an oilrig and a communications network connecting the oilrig to a central server to move data from the rig of a group of rigs to the server. The server displays the results in hierarchical form. The server sends commands, application programs and data to the rig from the server.

The Health Check system of the present invention further comprises a central database populated with dynamic status reported from oilrigs comprising an oil recovery system. The present invention further comprises a web page display for efficiently displaying Health Check results associated with a test, a rig, an area or an oil recovery system. The web page results can be displayed on a computer, cell phone, personal data assistant (PDA) or any other electronic display device capable of receiving and displaying or otherwise alerting (e.g., sound notification) a user of the status of the data. The preferred screen is a color screen to enable red/green/yellow/gray display results. Results can also be audio, video or graphically encoded icons for severity reports, e.g., an audio message may state audibly, "situation green", "situation red" or "situation yellow" or display a particular graphical icon, animation or video clip associated with the report to demonstrate a Health Check severity report. The present invention enables drilling down (that is, traversing a hierarchical data structure tree from a present node toward an associated child or leaf node), into a tree of nodes representing diagnostic status, to a node or leaf level to access additional information regarding a color-coded report.

The present invention also provides a notification system to immediately inform service personnel of problems as necessary, such as a message or email to a cell phone or pager or computer pop up message. There is also a receipt affirmation function that confirms that a notification message was received and acknowledged. Secondary and tertiary notifications are sent when a primary recipient does not acknowledge an affirmative notification within a configurable time limit. A severity report associated with a given problem is represented by a blinking color when it is unacknowledged and remains a blinking color until the given problem is cleared and returns to green or clear status. Severity reports once acknowledged change from blinking to a solid color. Reports that have been acknowledged by one user may be transferred or reassigned to another user upon administrative permission by a system supervisor or by requesting permission to transfer a second user and receiving permission from the second user. A system supervisor can also display a list of users and severity reports being handled by the user, that is, a list of acknowledged and in progress severity reports assigned to a particular user to view and enable workload distribution to facilitate reassignments for balancing the work load.

A dispatch may assign a work order to a group of particular severity reports. Once the work order is completed the system checks to see if the nodes associated with the work order have been cleared. The work order provides a secondary method for determining if nodes associated with a work order have been cleared after a work is complete. The system administrator software program can also automatically check the work order against the node state for a system check.

The advantages provided to the customer of a preferred Health Check system are substantially less down time due to the present invention's Health Check's ability to find or anticipate problems earlier and fixing the problems faster, ideally before the customer becomes aware that a problem has occurred. The present invention reassures the customer that the Health Check system is always on the job and monitoring and reporting on the oil recovery system 24 hours a day, seven days a week. A customer or system user, can always call in and confirm the status of an entire oil recovery system or single rig with a single call to the central server or a rig and receive a situation report, that is situation red, yellow, green or gray for the oil recovery system or single rig, as requested. The present invention enables more efficient use of operational service personnel. The present invention finds and reports problems, potential problems and trigger events of interest, which enables rapid response and recovery in case of actual and/or potential equipment or operator malfunctions or the occurrence of a particular event. The present invention also helps to find problems at an early stage when the problems are often easier to fix, before catastrophic failure, thus creating less impact on the customer's oil recovery system or individual oilrig. Health Checks provides a method and apparatus for providing an application program that acts as an ever-vigilant set of eyes watching an entire oil recovery system or single rig to ensure that everything is okay, that is, operational.

All results for each oilrig in an oil recovery system or individual oilrig or equipment are worst-case combined so that the worst-case severity report bubbles to the top of the reporting tree and is reported as the status for an entire oil recovery system, oilrig(s), event of interest, process, or equipment being analyzed. As discussed above, red is a worst-case severity report, followed by yellow severity report and then green is the least severe report. Gray indicates no data available. Thus, if one or more tests reporting a red status is received from an oilrig, the red status bubbles up past all yellow and green status reports and the status for the rig and the entire oil recovery system in which the rig resides is shown as red. Once the red report is cleared, yellow reports, if any, bubble up and the status of the oil recovery system, rig or equipment being viewed is shown as yellow, if a yellow report is in a node tree transmitted from any oilrig in an oil recovery system. The status for a single oilrig bubbles up the worst-case report as well, however, localized to the single rig or rigs under investigation, unless grouped. When grouped the worst-case status for the group is reported. For example, if three rigs were reporting the following scenario is possible: Rig 1 reports red, rig 2 reports yellow and rig 3 reports green. The status for a group selected to include rigs 1, 2 and 3 would be red. The status for a group selected to include rigs 2 and 3 would be yellow. The status for a group selected to include rig 3 only would be green. Subsections within a rig can also be selected for a color-coded status report. Preferably, the gray is not cleared. Usually, if the test were not conducted for any reason, the status would take gray color.

The present invention enables testing at the nodes of a bottom up tree structure representing an oil recovery system, a single rig therein, or an equipment in an oilrig, wherein the nodes carry the results to the top for easy visualization and use. The present invention also provides a dynamic reporting protocol for data transfers from an oilrig to a central server wherein level identifiers are provided to transfer data and its structure in a single packet transfer, thus enabling dynamic data base population and display of reports from an oilrig. The results are presented on a web page or reported to cell phones, computers, pagers, personal data assistants or otherwise affirmatively reported other wise to appropriate personnel. In a preferred embodiment, reports are acknowledged by a first recipient or a second recipient is selected for receipt of the report when the first recipient does not acknowledge receipt, and so on, until a recipient has received and acknowledged the report. Alternatively multiple recipients may simultaneously get the notification.

The present invention is automatically scaleable and extensible due to the modular and dynamic nature of its design. Tests can be easily created, added or deleted and parameters added or modified on an oilrig equipment test or Health Check without reprogramming or changing the central server's database population, data reporting and data display applications. The reporting can vary between broad coverage and specific coverage, that is, a status report can included data for an entire oil recovery system comprising over 100 oilrigs and/or specifically report status for a single oilrig of interest concurrently.

The present invention provides early warning of potential and actual failures and also provides confirmation of product performance and usage. A set of automated Health Checks and diagnostic tests is selected to run in real time on an oilrig. Status from the test is reported continuously via a communication link between the oilrig and a central server. The present invention provides insight and analysis of equipment, processes and equipment usage on an oilrig. The present invention monitors alarms and parameter limits to assess necessary action and perform affirmative notification of appropriate personnel.

The present invention provides quick response, real-time monitoring and remote diagnostics of the automation and control systems running on oilrigs comprising a fleet of oilrigs or an oil recovery system to achieve maximum rig performance while maintaining optimum personnel allocation. A service center is connected to the oilrigs through an Internet based network. System experts make real-time data and logged data from the oilrigs available for perusal and analysis in a central facility or at distributed locations. The web site of the present invention provides access to current operational status as well as to historical operation and performance data for each of the rigs comprising an oil recovery system.

Health Check tests are configurable so that new tests can be created, added or deleted and parameters changed for execution at an oilrig with out the necessity of programming. A simple user interface is provided wherein a user at the central server or at an oilrig can select a test from a library of existing tests, or create a new test using a scripting language, natural language interface or pseudo language is provided which generates a script defining inputs, outputs and processing logic for a test. The script is compiled and sent to the rig for addition to existing Health Checks running on the rig. The user interface also enables modification or addition and deletion of parameters associated with a Health Check or test.

Notifications can be an immediate message when a problem is detected or an advisory notification. The notification is sent to expert service personnel associated with the central server or can be directed to a service manager or local service person closest to the rig needing service. For each rig and problem type, a particular person or service personnel category is designated for receipt of a notification. Secondary and tertiary backup personnel and personnel categories are designated as a recipient for each notification. Affirmative notifications must be acknowledged by the recipient so that the problem is acknowledged and someone has taken responsibility for the problem. If an affirmative notification is not acknowledged within a configurable time period, then a secondary or tertiary recipient is notified until the problem is acknowledged. Reliability reports are generated by the present invention showing performance summaries for oilrigs, comprising up time, response, problems detected and solutions provided. These reports provide an objective basis for formulating an evaluation of the Heath Check system's efficiency.

The results from a rig comprise processed inputs from the rig. No processing is required at the central server, other than display, storage and alerts to appropriate personnel. The oilrig Health Checks and tests are configurable so no programming is required to implement a new test or change logic or parameters for an existing test. A field engineer or central server personnel can add a new test without requiring a user to perform a programming change. The present invention provides a local or remote user interface, which provides a simple interface for describing a test and logic. The interface comprises an iconic presentation, pseudo language, script or a natural language interface to describe a test's input(s), processing logic and output(s). The user interface interprets a user's inputs and converts the user's input into a scripting language. The script language is compiled and sent to the rig on which the new or augmented test is to be performed. The new test is added to a library of tests from which a user may choose to have run at a rig. Test modules can be deleted, added, parameters changed, and updated from the oilrig, the central server or from a remote user via a remote access electronic device.

Figure 2:
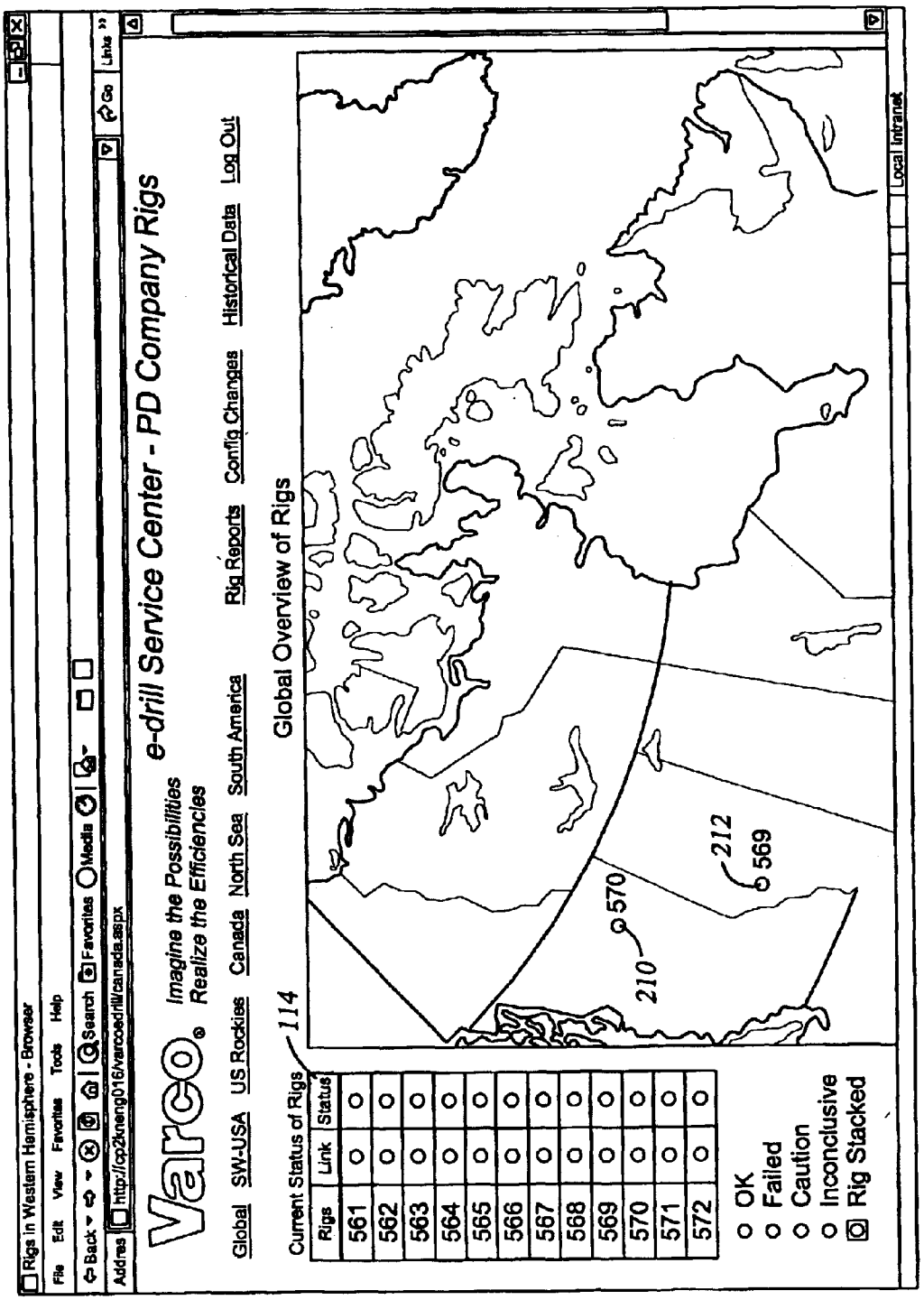
FIG. 2 is an illustration of a preferred status display for an oil recovery system showing status for individual rigs and aggregated worst-case status for a smaller geographical area including Western Canada.

Turning now to FIG. 1, a preferred embodiment of the present invention is shown illustrating a global overview 100 of all rigs comprising an oil recovery system. As shown in FIG. 1, a map pinpoints geographic locations of the rigs in the system of interest. A web page display is presented on a personal computer or PDA. The web page generated by the central server presents a geographic view of an oil recovery system. In FIG. 1, rig number 563 102 and rig number 569 104 is shown with a red status, indicating that a condition or reporting event of interest has occurred at rig number 563 and number 569. Rig number 569 106 is in Canada and rig number 563 108 is in the United States. Rig number 571 110 has a yellow status and rig number 567 112 has gray status. All other rigs shown in FIG. 1 have a green status. When a system user clicks on rig number 569 106 or the Canadian region, the display of FIG. 2 appears. FIG. 2 shows the Canadian region, which includes rig number 569. Notice that rig number 570 210 has a green status is now displayed on the more detailed Canadian region display. The green status geographical indicator for rig number 570 is suppressed and not shown in the broader display of FIG. 1 so that the more severe red status of rig number 569 would be immediately visible and evident on the display of FIG. 1. Once a user implicitly acknowledges the red status for rig number 569 by clicking on rig number 569, the present invention displays the less severe status of rig number 570. Thus, the more severe status of rig number 569 bubbles up in the geographical display and is displayed first at a higher level in the geographical display hierarchy. Note that the green status indicator of rig number 570, however, is shown in the panel 114 of FIG. 1 and FIG. 2. Thus, the present invention presents a hybrid display in which all Health Check results are available in the panel 114 but worst case results are presented in the geographical displays of FIG. 1 and FIG. 2.

Turning now to FIG. 3, the status display 314 of FIG. 3 for rig number 569 is shown when a user clicks on rig number 569 104, 212 in FIG. 1 or FIG. 2. FIG. 3 illustrates that a rig number 569 component, "Rigsense" has a red indicator 312. The Magnifying Glass icon 312 shown adjacent red indicator 310 indicates that more information is available regarding the red indicator 310. Notice that there are also additional panel displays 316 and 318, which are configurable, which perform additional informative functions. A summary panel 320 is displayed for rig number 569. The summary status panel contains operator reports from the oilrig. These operator reports are useful in diagnosing status and formulating a plan of action or notification. An Auto-Driller status panel 316 is also displayed. Note that the Weight on Bit (WOB) indicator 317 is red in the AutoDriller status panel. A driller adjustable parameters panel 318 is also displayed.

Figure 4A:
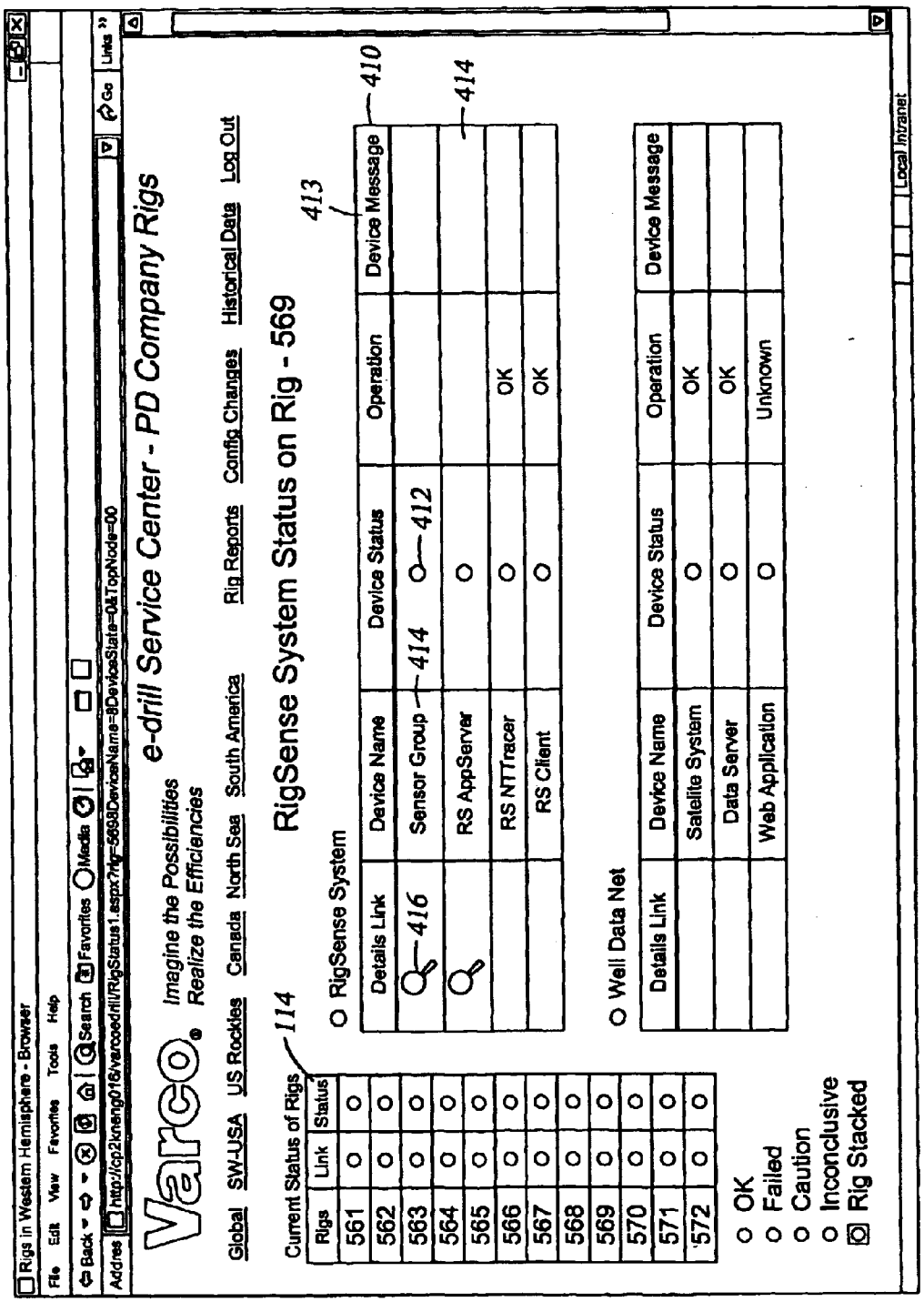
FIG. 4A is an illustration of a preferred status display for an oil recovery system and a sub status for an individual rig.

Turning now to FIG. 4A, continuing with rig number 569, clicking on the red indicator for Rigsense status in FIG. 3, brings up the display for the Rigsense system panel status 410 as shown in FIG. 4A. Note that the device message block 413 may contain a part number 411 to expedite repair of a failure as reported. The particular part number and or drawing number necessary to perform a given repair associated with a given problem or severity report may be difficult to find in a vast inventory of parts and part numbers and drawings associated with a given failure. Otherwise, the recipient of a failure report may have to search via key words through a vast inventory of parts, part numbers and drawings associated with a given failure. Moreover, the user may not be familiar with a particular vendor's part numbering system, thus, provision of the part number is a valuable expedient to trouble shooting.

Figure 6:
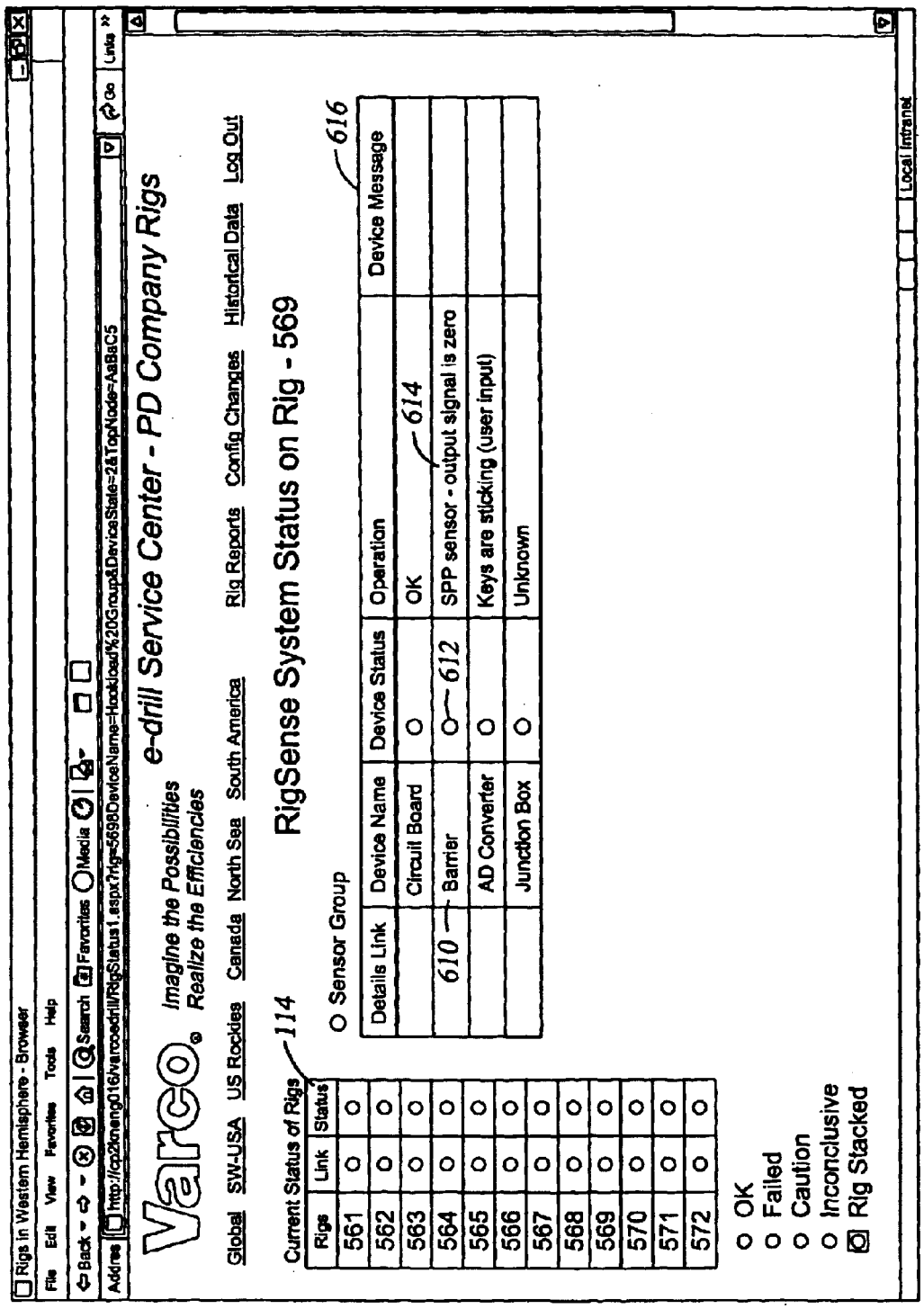
FIG. 6 is an illustration of a preferred status display for an oil recovery system and a lower level sub status for an individual rig.

FIG. 4A shows that the sensor group device status 412 is red with a Magnifying Glass icon 416 indicating that more information is available for the red sensor group device status indicator 412. In an alternative embodiment, as shown in FIG. 4B, a pop-up message 415 appears along with the Magnifying Glass stating "Click on Magnifying Glass for more details." Clicking on the red sensor group 414 device Magnifying Glass 416 brings up the display 510 of FIG. 5, showing a detailed status for the sensor group device status. Note that there are two red indicators shown in FIG. 5 for device status in the sensor group as follows: "Pump 3 Stroke Count Sensor" 516 and "Hookload Sensor" 514. Note that the Pump 3 red device status indicator has a informational comment 512 in the operation column of the display of FIG. 5, stating "Intermittent Loss of Signal." The Hookload Sensor red device status indicator present an adjacent Magnifying Glass icon 518 with a message indicating that more information is available for the device status of the Hookload sensor by clicking on the Magnifying Glass icon. Clicking on the Magnifying Glass indicator 518 for the Hookload sensor brings up the Hookload sensor panel 616 of FIG. 6, which shows that the device name "Barrier" 610 had a red device status indicator 612. The red device status for the Barrier displays an Operation message 614, stating, "Excessive ground current". Each colored indicator and accompanying operation message shown in the preferred displays illustrated in FIGS. 1–6 appeared in line of the Health Check performed at an oilrig and sent to the server in the structured protocol of the present invention.

Figure 9:
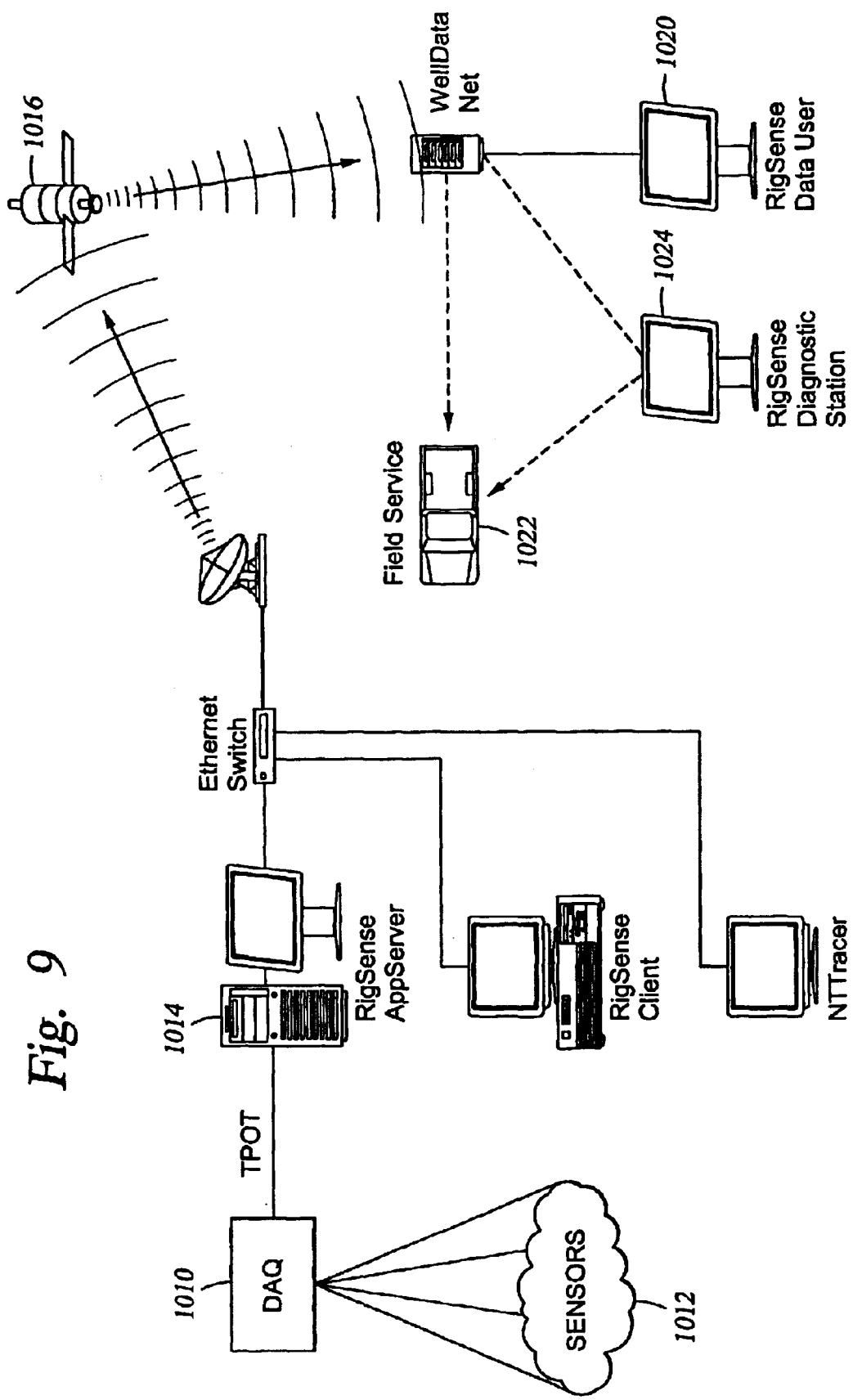
FIG. 9 is an illustration of a preferred health check system reporting health checks from an oil rig to a user via satellite.

FIG. 7 illustrates a Driller Adjustable parameters display 710 with two red indicators showing that Drill Low Set Point 712 and Upper Set Point 714 are Outside Range. A Drilling Tuning parameters panel 716 is also displayed. Both panels indicate the current value, changed indicator and outside range indicator for each parameter displayed in the respective panels of FIG. 7. The display of FIG. 7 is an alternative tabular display for rig status for a single rig. FIG. 8 illustrates a configuration or driller adjustable parameters status panel 810 for rig numbers 178–189. The display of FIG. 8 is an alternative tabular display for rig status for plurality of rigs, e.g., rigs 178–189. Turning now to FIG. 9, a data acquisition system 1010 is shown in an oilrig environment connected to a plurality of legacy or Heath Check sensors 1012, which gathers data from the group of sensors monitoring the rig equipment, parameters and processes. The data acquisition system 1010 sends the acquired data from the sensors 1012 to a computer 1014 on which the preferred Health Check application of the present invention is running. The application of the present invention performs Health Checks logic on the acquired data and reports the results in the structured protocol to a user via satellite 1016 or some other form of electronic communication. A user may monitor health check status and receive notifications via a electronic receiver 1020, diagnostic station 1024 or mobile in field service vehicle 1022.

The present invention is also useful for Process Monitoring, that is, to determine that equipment is being used properly to perform a designated process. For example, if rig operators are using an "override" during a certain system state indicative of a certain process, which is supposed to be run automatically rather than manually overridden, the present invention can perform a health check to detect this event of interest and report it to the central server. Knowledge of this occurrence enable central server personnel to detect and correct the inappropriate action of the operators. Moreover, the test to detect the inappropriate override stays in the system so that if new operators recreate the problem or trained operator backslide into using the manual override inappropriately, the central server personnel will be notified so that the problem can be address again. Thus, the Health Check system builds a cumulative base of operational check to insure that a process on a rig or oil recovery system runs in optimal fashion.

Figure 10:
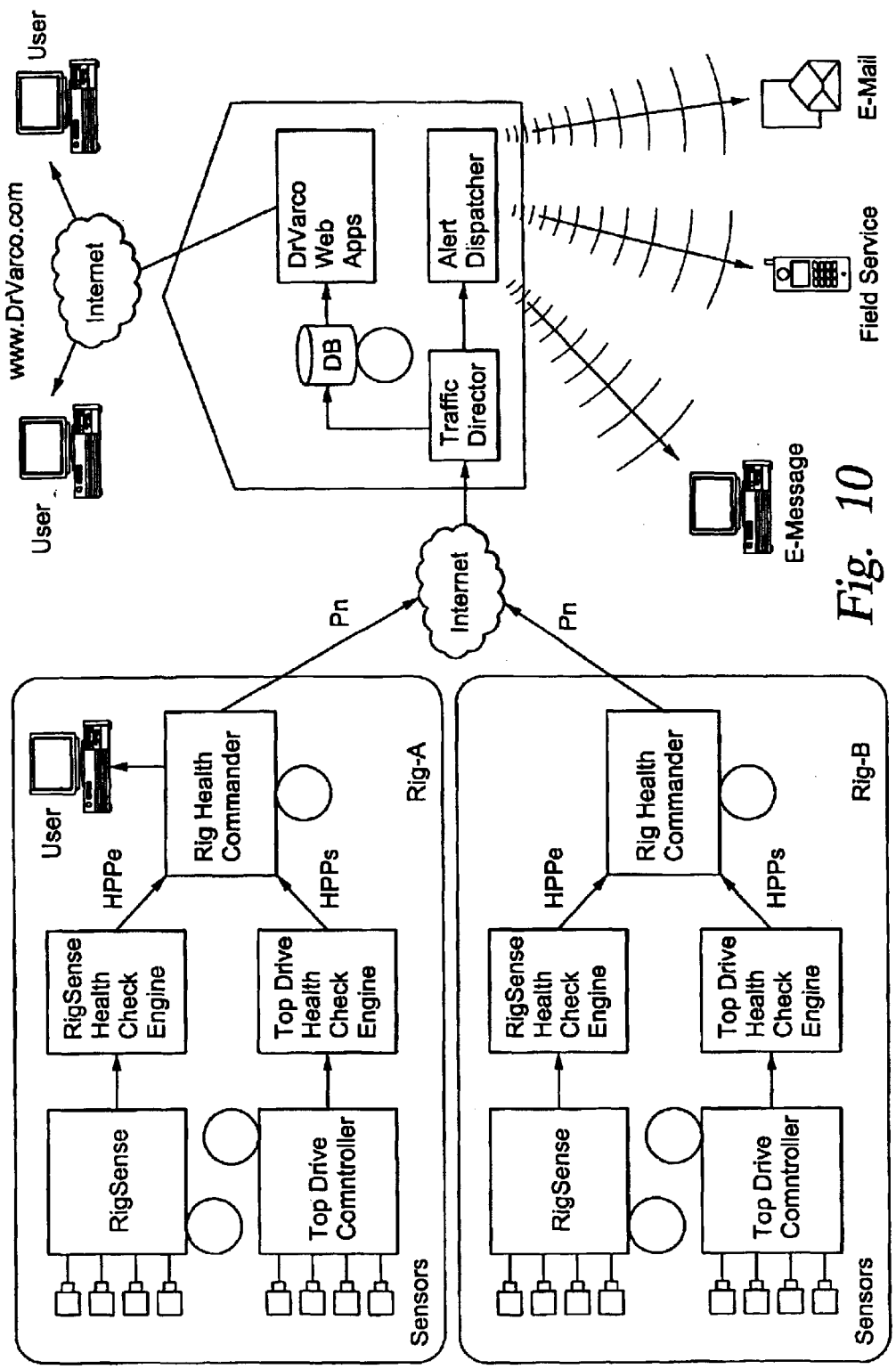
FIG. 10 is an illustration of a preferred health check system reporting health checks of multiple equipments, processes or systems from multiple oil rigs to a multiple users.

Turning now to FIG. 10, FIG. 10 is an illustration of a preferred Health Check system reporting health checks of multiple equipments, processes or systems from multiple oil rigs to multiple users.

Figure 11:
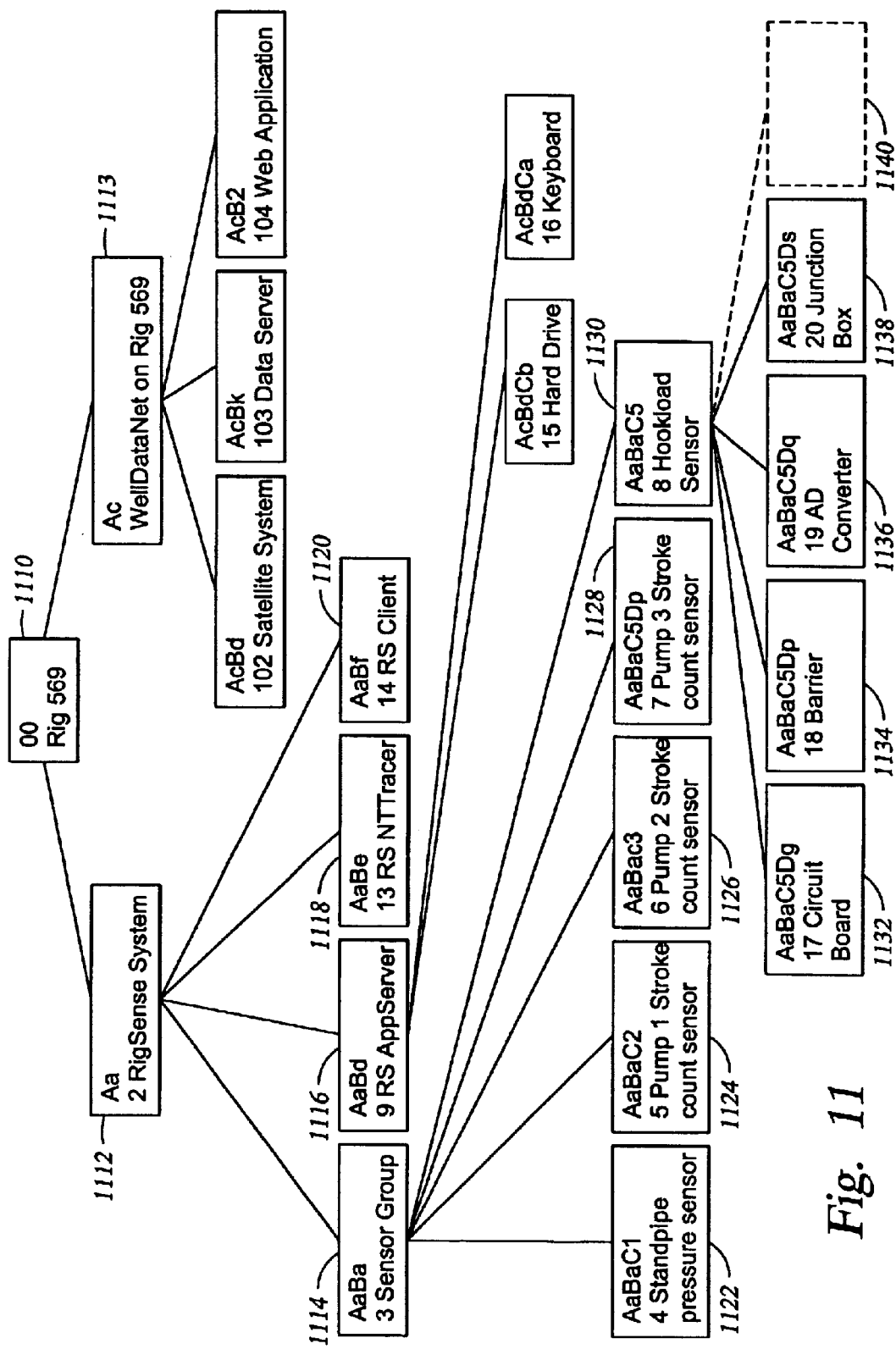
FIG. 11 is an illustration of a preferred protocol which defines an event reporting data structure for data base population and display.

Turning now to FIG. 11, the results of the tests are reported to the central server in a special protocol that contains heath check results data and describes the manner in which the data is constructed so that the data can be placed in a logical data structure or tree format and displayed. Note that the root node 1110, usually an oilrig has a designation of "00". The first level of nodes 1112, 1113 etc. under the root node are named Aa, Ab, Ac, Ad, etc. Each subsequent layer of node is named with the name of the parent node followed by a designation of the current node. For example, as shown in FIG. 11, for a rig number 569, the root node 1110 is named "00", the first level of children nodes under the root node are named Aa 1112 and Ac 1113. The children of node Aa 1112 are named AaBa 1114, AaBd 1116, AaBe 1118 and AaBf 1120 as shown. The children of child node AaBa are named AaBaC1 1122, AaBaC2 1124, AaBaC3 1126 and AaBaC4 1128. The children of node AaBaC5 1130 are named AaBaC5Dg 1132, AaBaC5Dp 1134, AaBaC5Dq 1136 and AaBaC5Ds 1138. A new test could be added to rig

569 number and the Heath Check status could be reported under node AaBaC5Dx 1140.

Changes to the Health Checks running on any or all rigs does not require changes to the display or data base population application because the preferred communication protocol defines the data base layout and display layout. The leaf nodes of the tree structure represent Health Check results. Each node contains a test identifier, test result (red/yellow/green/gray), intermediate data, user-entered data and test description. Trouble shooting comments are provided at the central server based on reported errors. Test error codes are included in the node so that messages associated with the error codes are displayed to the appropriate user. Alternately, trouble shooting and other information can also be generated and appended to the results of the tests at rig site. Thus, no processing to determine rig status is done at the central server. Notifications are sent when deemed necessary by the application. Notification logic is configurable by service personnel at the central server or at the oilrig. Notification logic dictates that notifications are sent when an event occurs and the event has been selected for reporting as a notification to a user. The notification logic and a list of appropriate notification recipients in order of priority, that is, who to contact first, is retained at the central server. The event can be a report on an equipment status, process execution or an operational item. A user can check in with the central server of present invention to obtain a real time report of the status of an oilrig or multiple oilrigs. The requesting user will receive a severity report message indicating the status of the rig, for example, "okay" or "red/yellow/green/gray."

The following are examples of Health Checks in a preferred embodiment of the present invention. In this example, VICIS-ED is a drilling rig information and control system; it includes control of the drawworks via a joystick.

Rig Health Check: Auto-drilling Performance

Auto-drilling Performance: In a preferred embodiment of the preferred invention, an autodriller in VICIS-ED controls ROP, WOB, torque and/delta-p parameters of the drilling process; it does this by controlling rate of line payout on the drawworks to limit the controlled parameters to setpoints specified by the driller. This health check tests verifies that the auto-driller is maintaining these parameters within acceptable limits. Acceptable control ranges typically have the following default values:

WOB: set point ±1000 lbs
ROP: set point ±10% of set point
Torque: set point ±10% of set point
Delta-P: set point ±100 psi At any given time during drilling, only one controller is in control. If no drilling occurred or auto drilling is not active during the last 24 hours this check is not possible and will not be included in the report. For each of the 4 controllers, the DCQA application computes the percent of time the feedback is within the allowable range. For each controller, this test is performed once a second when the controller has been in control for a minimum of 10 seconds. A count of acceptable and total test results is accumulated for each controller. At 6 am for the previous 24 hours, this test computes the percent of time each controller's feedback was within the specified range, for all valid tests. If at least 20 tests for a controller were not done in the last 24 hours (which includes when there was no drilling or if the auto-driller was not used), that controller's health check result is gray. Otherwise, the percentage of acceptable control counts is compared to pre-set values to categorize the result as red, yellow or green.

Health Check: Use of System Keyed Override Switch

VICIS-ED provides a keyed override switch, whose use should not be required for routine operation of the system. In 24-hour periods, the status of this switch is monitored once a second, resulting in a count of times the switch was activated. A count greater than zero produces a red result for this health check, otherwise it is green. If this switch is used, this check is deemed failed and the number of engagements of this switch is documented in the command center log. This test monitors the state of the keyed override switch once a second and counts the number of times the switch has been pressed. If the switch is on when the test starts, that is counted as a key press. At 6 am for the previous 24 hours, the health check is conducted, which consists of comparing the number of switch activations to a count of zero. If the switch has been pressed one time or more, the health check result is red; otherwise, it is green.

Health Check: "Joystick Control"

Joystick Control: The joystick controls the movement of the block; when hoisting it controls engine speed and when lowering it controls application of brake. For each 24-hour period, joystick movement and the resulting block velocity changes are observed. This test uses a comparison between joystick position (hoist, lower or neutral) and block velocity. In general, both parameters should be moving in the same direction. This test consists of identifying times where the joystick and the block are moving in opposite directions. The rules for this test procedure are specific to the joystick position.

Health Check: Joystick in Hoist/lower Position

This Health Check watches for a minimum of 3 consecutive joystick positions in same direction (i.e. all hoisting or all lowering) and compares the joystick position and block velocity in the third sample. If the joy stick position and the block velocity are in opposite directions, the Health Check increments the appropriate joystick hoist or lowers the error count. This test is not performed while the system is in keyed override or in a slip-and-cut mode.

Health Check: Joystick in Neutral Position

This Health Check detects watches for a minimum of 3 consecutive joystick positions in neutral direction. If the block is rising or falling in the third sample, it increments the joystick neutral error count. This Health Check is not performed while the system is in keyed override or in slip-and-cut mode.

The "block falling" portion of this test is not performed when the auto driller is on. If the sum of the error counts for all of the above tests are greater than 0 for the previous 24 hours, the health check result is red; otherwise, it is green. The joystick position is determined using the hoist and lower switches in the joystick assembly. The test also uses the following parameters:

Sign conventions and tolerances:
Block velocity>1.0 ft/min $\Rightarrow$ upward block movement.
Block velocity<−1.0 ft/min $\Rightarrow$ downward block movement.

Health Check: Use of Auto-drilling

It is assumed that the autodriller should be used and provide optimal performance during most drilling operations.

To conduct this test, the Health Check monitors the bit-on-bottom state and auto-driller state from the drill logic in the drilling instrumentation system. It computes the percent of drilling time when the auto driller is in use on a one-second sampling as follows:

100×(number of times AD on AND bit-on-bottom)/(number of times bit-on-bottom).

At 6 am for the previous 24 hours, the test outputs the percent of drilling time the auto driller was used and this health check.

This Health Check consists of comparing this percentage against a threshold of 98%. If the percentage is <98%, the health check result is red; otherwise it is green. If no drilling was done, the health check result is gray. The percent of time on-bottom drilling is also computed, based on bit-on-bottom status.

Health Check: System Settings Changes

A large number (more than 100) of system setting parameters exist in VICIS-ED; some are initial system settings, some are expert tuning adjustments and some are operational in nature and driller-specified. Many of these parameters preferably do not require changing on a daily basis, and knowledge of which parameters changed and how is vital for providing support to maintain system performance and ensure optimal usage. This test monitors all tuning parameters and maintains a count of changes by parameters and by groups of parameters (example—driller-initiated parameters). The following parameters are monitored, grouped as follows:

The following are User/Driller-Adjustable Tuning Parameters: Large Piston Bias for Tripping; Large Piston Bias for Drilling; Driller ROP Gain Factor-Adjust; Driller WOB Gain Factor-Adjust; Driller Torque Gain Factor-Adjust; and Driller DeltaP Gain Factor-Adjust.

Driller-Adjustable Operational Parameters: Drill Stop Point; Low Set Point; High Set Point; Swab Speed for Trip Out; Surge Speed for Trip In; Stand Lowering Time; Surge Speed for Run Casing; Joint Lowering Time; Connection Lowering Speed; Connection Hoisting Speed; Trip In Kick Out Alert; Trip Out Height Alert; ROP Set point; WOB Set point; Delta P Set point; Torque Set point; Engine Cut Slip Speed Set point; Lines Strung; and Bail Length.

The following are Password-Protected Parameters: Block weight; Brake horsepower; Encoder resolution; Brake air supply alarm low limit; Brake air supply alarm high limit; Engine tuning gain; Engine tuning integral; Brake hoisting tuning gain; Brake hoisting tuning integral; Brake lowering tuning gain; Brake lowering tuning integral; ROP loop tuning gain; ROP loop tuning integral; WOB loop tuning gain; WOB loop tuning integral; Torque loop tuning gain; Torque loop tuning integral; Delta P loop tuning gain; and Delta P loop tuning integral.

This test records the value for each parameter upon startup. On a 24-hour basis starting at 6 am CST, the test maintains a count of the number of times each parameter's value is changed, and if a parameter was outside the preferred range.

The application outputs the following at 6am CST: a "value has changed" state for each parameter; a "value was out of range" state for each parameter; count of parameters changed per group; color-coded test result for each group; and color-coded test result for System Settings.

The test results for each parameter are color-coded in the following order:

If (parameters was out of preferred range)→red;
else, If (parameters was changed)→yellow,
else
If (parameter input was not valid)→gray ("test environment failure"),
Else→green.

The group test results are color-coded as the "worst case" test result of all the parameters in the group.

Based on the above results, the System Settings test status is color-coded in the following order:

If (one or more of the above tests are red)→red,
else If (one or more of the above tests are yellow) →yellow,
else If (one or more of the above tests are "test environment failure")→gray("test environment failure"),
else→green.

Health Check: BCS Function

The BCS (block control system) limits the driller's operation of the block such that it does not exceed safe limits of operation. This check tests the operation of block control system compared to the preset limits it is required to enforce. To pass the test, the block should operate within the position/velocity envelope enclosed by upper and lower set points and maximum velocity set points. Pre-determined tolerance ranges are specified upon installation. The specification for VICIS-ED BCS operation is as follows:

Elevator position cannot go past 4 ft above high set point.
Elevator position cannot go past 1 ft below low set point.
Block velocity cannot exceed dynamic system-specified maximum velocity (specific to hoisting or lowering).

The test maintains a count of each of the following failures:

Elevator position>(high set point+4.0).
Elevator position<(low set point−1.0), if auto driller is off.
Elevator position<(drill stop point−1.0), if auto driller is on.
Elevator velocity>(1.10×max. lowering speed), if lowering
Elevator velocity>(1.10×max. hoisting speed), if hoisting.

The health check is not done if either the range override or the keyed over ride are on, or if in slip-and-cut mode. These counts are reset to zero at 6 am and are maintained on a 24-hour basis. At 6 am, the counts will be summed. If this sum is greater than zero, the health check result is red; otherwise, it is green.

These health checks include rules to qualify inputs as valid. Examples of these rules are:

Elevator position: at least one value has been received, AND current value must be between −20 ft and 150 ft.
Block velocity: at least one value has been received, AND current value must be between −5000 ft/min and 5000 ft/min.
Keyed override switch state: at least one value has been received, AND current value must be 0 or 1.
Rate of penetration: at least one value has been received, AND current value must be >=0.
Weight-on-bit: at least one value has been received
Torque: at least one value has been received, AND current value must be >=0
Lines strung: at least one value has been received, AND current value must be from the values 2,4,6,8,10,12,14,16, 18,20.
Joystick Hoist Switch State; Joystick Lower Switch State: at least one value has been received, AND current value must be 0 or 1.

In another embodiment, the present invention is implemented as a set of instructions on a computer readable medium, comprising ROM, RAM, CD ROM, Flash or any other computer readable medium, now known or unknown that when executed cause a computer to implement the method of the present invention.

While the foregoing disclosure is directed to the preferred embodiments of the invention various modifications will be apparent to those skilled in the art. Examples of the more important features of the invention have been summarized rather broadly in order that the detailed description thereof that follows may be better understood, and in order that the contributions to the art may be appreciated. There are, of course, additional features of the invention that will be described hereinafter and which will form the subject of the claims appended hereto.

What is claimed is:

1. A method for monitoring and analyzing a plurality of signals from monitors on at least one first drilling rig of a plurality of drilling rigs, the method comprising providing a plurality of monitors for monitoring a status of a first drilling rig in a system of a plurality of drilling rigs, monitoring with the plurality of monitors information indicative of events at the first drilling rig, transmitting signals from the monitors indicative of the information to a processor on the first drilling rig, the processor including a set of health check rules for health checks comprising logical rules, inputs and outputs for defining events associated with the status of the first drilling rig, determining with the processor a severity code for each event, reporting the events and severity codes with the processor to a central server, the events reported by the processor to the central server in a protocol defining a data structure, the data structure comprising a hierarchical tree node structure wherein results from application of the health check rules are a bottommost node of the tree node structure, and displaying the event severity codes on a display.

2. The method of claim 1 further comprising the processor on the rig providing the severity codes in hierarchical order, and displaying the severity codes in order of severity with a higher severity code displayed before a lower severity code.

3. The method of claim 1 further comprising making the display of the severity codes available for viewing at any site of a communication's network.

4. The method of claim 1 wherein the method is done in real time.

5. The method of claim 1 wherein the method is done automatically.

6. The method of claim 1 further comprising providing with the processor to the central server the results as records containing node information regarding an appropriate location for the results in the tree node structure.

7. The method of claim 1 further comprising sending an affirmative notification of an event to a primary contact.

8. The method of claim 1 further comprising sending an affirmative notification of an event to a primary contact, and following failure of action with respect to the event, sending an affirmative notification to a secondary contact.

9. The method of claim 1 further comprising displaying a status for the first drilling rig in a geographic display.

10. The method of claim 9 further comprising displaying the severity codes in the geographic display.

11. The method of claim 1 wherein the central server includes computer apparatus with a program for reporting and displaying results, the method further comprising changing at least one of the health check rules of the set of health check rules in the processor on the rig without changing the program in the central server.

12. The method of claim 1 further comprising reporting a worst-case severity code prior to reporting other severity codes which are not as severe as the worst-case severity code, and displaying the worst-case severity code prior to the other severity codes.

13. The method of claim 1 wherein the central server has a database population, data reporting application, and data display application, the method further comprising changing a health check rule in the processor without changing the central server's database population, data reporting applications, and data display applications.

14. The method of claim 1 further comprising running the health checks in real time to provide results regarding on-going status of equipment on the rig and to indicate potential failures of equipment.

15. The method of claim 1 wherein no processing of results is done at the central server.

16. The method of claim 1 further comprising sending notification of an event to multiple contacts.

17. The method of claim 1 wherein the monitors are sensor apparatuses for sensing parameters related to the status of the first drilling rig.

18. The method of claim 1 wherein the first drilling rig is for conducting wellbore drilling operations and the monitors transmit signals indicative of parameters related to said wellbore drilling operations.

19. A method for monitoring and analyzing a plurality of signals from monitors on at least one first drilling rig of a plurality of drilling rigs, the method comprising providing a plurality of monitors for monitoring a status of a first drilling rig in a system of a plurality of drilling rigs, monitoring with the plurality of monitors information indicative of events at the first drilling rig, transmitting signals from the monitors indicative of the information to a processor on the first drilling rig, the processor including a set of health check rules for health checks comprising logical rules, inputs and outputs for defining events associated with the status of the first drilling rig, determining with the processor a severity code for each event, reporting the events and severity codes with the processor to a central server, the events reported by the processor to the central server in a protocol defining a data structure, the data structure comprising a hierarchical tree node structure wherein results from application of the health check rules are a bottommost node of the tree node structure, wherein the central server includes computer apparatus with a program for reporting and displaying results, displaying the event severity codes on a display, the processor on the rig providing the severity codes in hierarchical order, displaying the severity codes in order of severity with a higher severity code displayed before a lower severity code, making the display of the severity codes available for viewing at any site of a communication's network, providing with the processor to the central server the results as records containing node information regarding the appropriate location for the results in the tree node structure, sending an affirmative notification of an event to a primary contact or to multiple contacts, displaying a status for the first drilling rig in a geographic display, and displaying the severity codes in the geographic display.

20. The method of claim 19 further comprising providing a plurality of monitors for each of the drilling rigs of the plurality of drilling rigs, monitoring with the monitors information indicative of events on each drilling rig, transmitting signals from the monitors indicative of the information to a corresponding processor on each rig, providing a set of health check rules in each processor, determining with the processors a severity code for each event, reporting the events and the severity codes with the processor to the central server, the events reported by the processors to the central server in a protocol defining a data structure, the data structure comprising a hierarchical tree node structure wherein results from application of the health check rules are a bottommost node of the tree node structure, and displaying the severity codes on a display.

21. The method of claim 20 further comprising the processors on the rigs providing severity codes in hierarchical order, and displaying the severity codes in order of severity with a higher severity code displayed before a lower severity code.

22. The method of claim 20 further comprising making the display of the severity codes available for viewing at any site of a communication's network.

23. The method of claim 20 wherein the method is done in real time.

24. The method of claim 20 wherein the method is done automatically.

25. The method of claim 20 further comprising sending an affirmative notification of an event to a primary contact.

26. The method of claim 20 further comprising sending an affirmative notification of an event to a primary contact, and following failure of action with respect to the event, sending an affirmative notification to a secondary contact.

27. The method of claim 20 further comprising displaying a status for the drilling rigs in a geographic display.

28. The method of claim 27 further comprising displaying the severity codes in the geographic display.

29. The method of claim 20 further comprising sending notification of an event to multiple contacts.

30. An apparatus for monitoring and analyzing a plurality of signals from monitors on at least one first drilling rig of a plurality of drilling rigs, the apparatus comprising a plurality of monitors for monitoring a status of a first drilling rig in a system of a plurality of drilling rigs, the monitors for monitoring information indicative of events at the first drilling rig, transmitting apparatus for transmitting signals from the monitors indicative of the information, a central server, a processor on the first drilling rig, the processor including a set of health check rules for health checks comprising logical rules, inputs and outputs for defining events associated with the status of the first drilling rig, the processor in communication with the transmitting apparatus for receiving the signals from transmitting apparatus, the processor for determining a severity code for each event and for reporting the events and severity codes with the processor to the central server, the events reported by the processor to the central server in a protocol defining a data structure, the data structure comprising a hierarchical tree node structure wherein results from application of the health check rules are a bottommost node of the tree node structure, and a display for displaying the event severity codes.

31. The apparatus of claim 30 further comprising the processor on the rig for providing the severity codes in hierarchical order, and the display for displaying the severity codes in order of severity with a higher severity code displayed before a lower severity code.

32. The apparatus of claim 30 further comprising the processor for providing to the central server the results as records containing node information regarding an appropriate location for the results in the tree node structure.

33. The apparatus of claim 30 further comprising apparatus for sending at least one notification of an event to at least one contact.

34. The apparatus of claim 30 further comprising the central server including computer apparatus with a program for reporting and displaying results, the processor programmed for changing at least one of the health check rules of the set of health check rules in the processor on the rig without changing the program in the central server.

35. The apparatus of claim 30 further comprising wherein the central server has a database population, data reporting application, and data display application, the processor programmed for changing a health check rule in the processor without changing the central server's database population, data reporting applications, and data display applications.

36. The apparatus of claim 30 further comprising the processor for running the health checks in real time to provide results regarding on-going status of equipment on the rig and to indicate potential failures of equipment.

37. The method of claim 30 wherein the monitors are sensor apparatuses for sensing parameters related to the status of the first drilling rig.

38. A computer readable medium containing instructions that when executed by a computer implement a method for providing a plurality of monitors for monitoring a status of a first drilling rig in a system of a plurality of drilling rigs, monitoring with the plurality of monitors information indicative of events at the first drilling rig, transmitting signals from the monitors indicative of the information to a processor on the first drilling rig, the processor including a set of health check rules for health checks comprising logical rules, inputs and outputs for defining events associated with the status of the first drilling rig, determining with the processor a severity code for each event reporting the events and severity codes with the processor to a central server, the events reported by the processor to the central server in a protocol defining a data structure, the data structure comprising a hierarchical tree node structure wherein results from application of the health check rules are a bottommost node of the tree node structure, and displaying the event severity codes on a display.

39. A computer readable medium containing instructions that when executed by a computer implement a method including providing a plurality of monitors for each drilling rig of a plurality of drilling rigs, monitoring with the monitors information indicative of events on each drilling rig, transmitting signals from the monitors indicative of the information to a corresponding processor on each rig, determining with the processors a severity code for each event, reporting the events and the severity codes with the processor to the central server, the events reported by the processors to the central server in a protocol defining a data structure, the data structure comprising a hierarchical tree node structure wherein results from application of the health check rules are a bottommost node of the tree node structure, and displaying the severity codes on a display.

* * * * *